(12) United States Patent
Kurfiss et al.

(10) Patent No.: US 7,104,149 B2
(45) Date of Patent: Sep. 12, 2006

(54) DEVICE AND METHOD FOR FIXING A SENSING MEANS

(75) Inventors: Frank Kurfiss, Muehlacker (DE); Ulrich Seger, Warmbronn (DE); Uwe Apel, Neckartailfingen (DE); Andre Skuppin, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/506,960

(22) PCT Filed: Dec. 7, 2002

(86) PCT No.: PCT/DE02/04495

§ 371 (c)(1),
(2), (4) Date: Jul. 20, 2005

(87) PCT Pub. No.: WO03/074333

PCT Pub. Date: Sep. 12, 2003

(65) Prior Publication Data

US 2005/0252315 A1  Nov. 17, 2005

(30) Foreign Application Priority Data

Mar. 5, 2002  (DE) .............................. 102 09 615

(51) Int. Cl.
*G12B 9/04*  (2006.01)

(52) U.S. Cl. ................................... 73/866.5
(58) Field of Classification Search ............. 73/866.5, 73/29.05
See application file for complete search history.

(56) References Cited

U.S. PATENT DOCUMENTS

| | | | | |
|---|---|---|---|---|
| 4,666,114 A | * | 5/1987 | Kroczynski et al. | ...... 248/205.6 |
| 5,556,493 A | | 9/1996 | Bomer et al. | |
| 5,898,183 A | * | 4/1999 | Teder | .......... 250/574 |
| 6,147,753 A | * | 11/2000 | Koyama et al. | ......... 356/237.3 |
| 6,437,560 B1 | * | 8/2002 | Kalb | ..................... 324/207.13 |
| 6,581,484 B1 | * | 6/2003 | Schuler | ..................... 73/866.5 |

FOREIGN PATENT DOCUMENTS

| | | |
|---|---|---|
| EP | 0 803 414 | 10/1997 |
| FR | 2 659 344 | 9/1991 |
| JP | 04 012 826 | 1/1992 |
| JP | 11 094 731 | 4/1999 |

\* cited by examiner

*Primary Examiner*—Robert Raevis
(74) *Attorney, Agent, or Firm*—Kenyon & Kenyon LLP

(57) ABSTRACT

A method and a device for attaching a sensor device relative to a glass pane of a motor vehicle are described, a contact space being provided, which is sealed and which is provided with a partial vacuum.

9 Claims, 2 Drawing Sheets

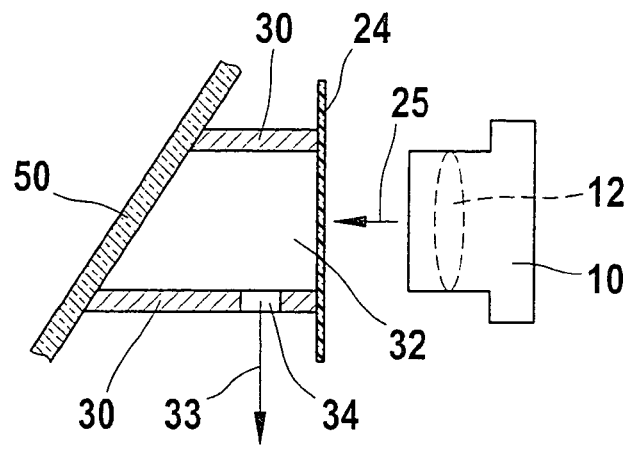
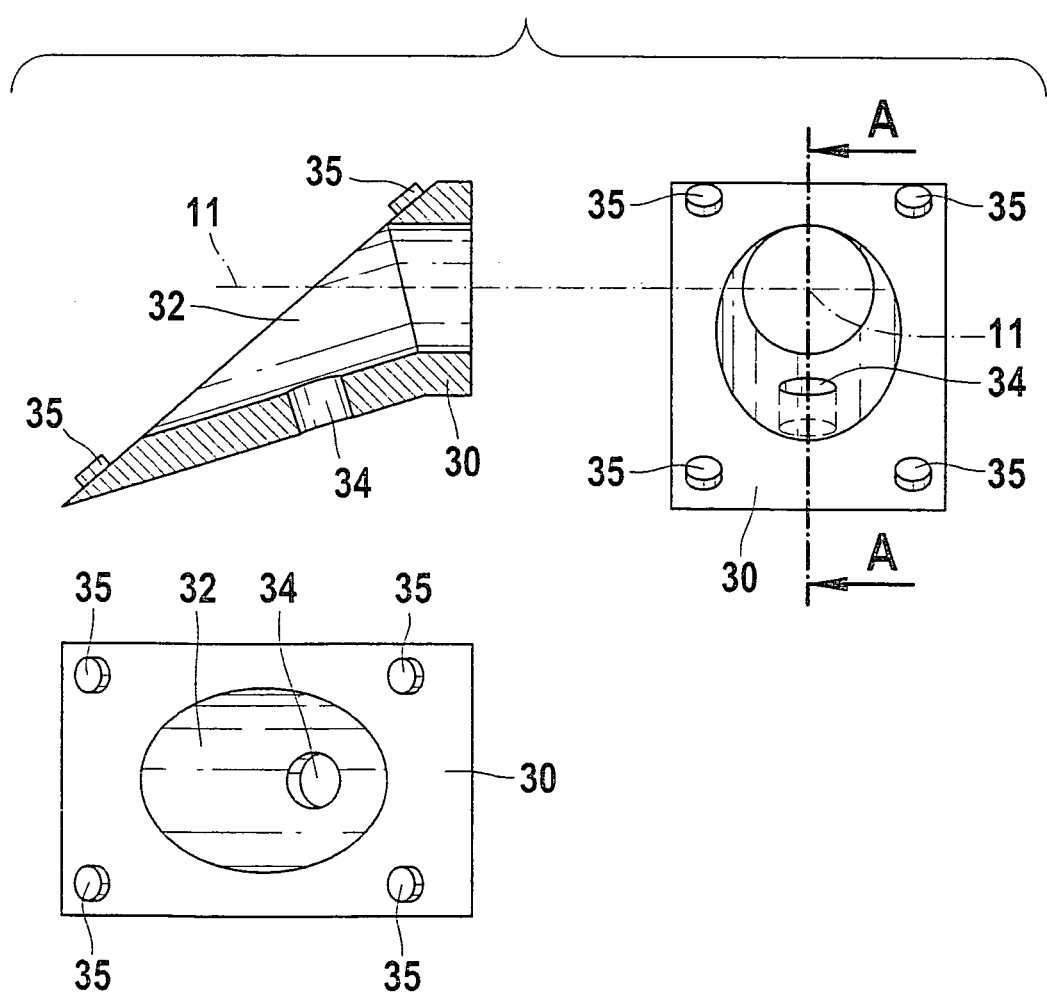

DEVICE AND METHOD FOR FIXING A SENSING MEANS

FIELD OF THE INVENTION

The present invention is directed to a device and a method for attaching a sensor means.

BACKGROUND INFORMATION

It is generally known that a measuring device, an optical sensor for example, may be attached to a glass pane, in particular to the glass pane of a motor vehicle, the windshield for example. However, various external influences affect the measuring function during operation. These include, for example, dust accumulation, condensation on the glass surface, i.e., the surface of the measuring device, after a temperature change in a detrimental climate, the deposit of gas released by plastics, or the exposure to everyday gases, such as cigarette smoke.

SUMMARY OF THE INVENTION

The device according to the present invention and the method according to the present invention have the advantage over the related art in that it is possible to attach the measuring device to the glass pane in a tight and sealed manner, so that adverse effects which occur during operation such as dust accumulation, condensation, and the like do not affect the measuring function of the measuring device.

It is particularly advantageous that a maximum amount of water vapor is provided in the contact space in such a way that the relative air moisture is less than 100% under the intended operating conditions. This ensures that condensation on the glass pane of the motor vehicle for example is avoided under all permissible operating conditions.

It is a further advantage that a dry gas is provided in the contact space. This results in further minimization of the amount of water vapor enclosed during installation.

It is a further advantage that attachment nubs are provided on the surface of the connecting device facing the glass pane. This, according to the present invention, makes it possible to adapt the connecting device to different glass panes in a particularly simple and cost-effective way.

It is a further advantage that an optically- and NIR-transparent (near infrared), condensed medium is provided in the contact space. This further reduces the possibility of adverse effects, steaming up of a glass pane for example.

It is a further advantage that the partial vacuum is generated by heating the inside of the contact space, followed by sealing of the contact space and subsequent cooling of the inside of the contact space. This makes it possible to generate the partial vacuum in the contact space in a particularly simple way according to the present invention.

It is a further advantage that the partial vacuum is generated via evacuation using an orifice in the contact space and subsequent sealing of the contact space. This makes it possible to generate the partial vacuum in a particularly simple way.

BRIEF DESCRIPTION OF THE DRAWINGS

FIG. 4 shows the pressing of the measuring device into the adapter and the generation of a partial vacuum.

FIG. 5 shows the illustration of three sides of the receiving adapter for attaching measuring devices to glass panes.

DETAILED DESCRIPTION

Figure 1:
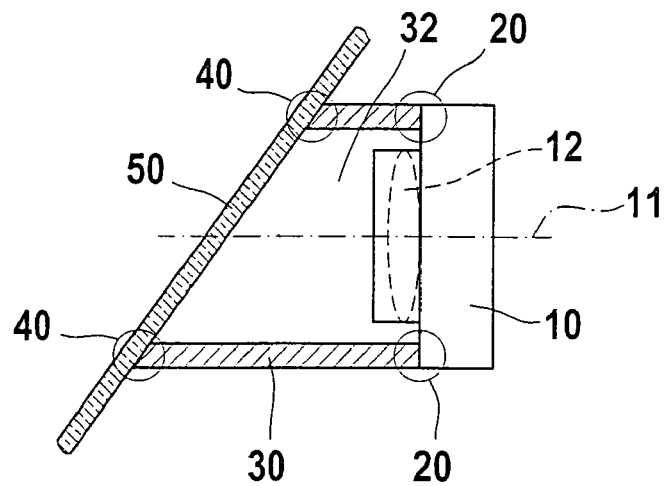
FIG. 1 shows a measuring system which is attached to a glass pane or connected to a glass pane.

FIG. 1 shows a device 30 according to the present invention with which the attachment of a measuring system 10 to a glass pane 50 is made possible according to the present invention. Measuring system 10 is also referred to below as sensor means 10. Glass pane 50 may be in particular a glass pane of a motor vehicle, the windshield in particular. Sensor means 10 includes an optical axis in particular which is provided with a dashed line and reference number 11 in FIG. 1. Furthermore, sensor means 10 includes an optical system which is drawn as a dashed line indicating a lens and has reference number 12 in FIG. 1. Device 30 for attaching sensor means 10 on glass pane 50 is also referred to in the following as adapter 30 or connecting device 30. Parallel to optical axis 11, adapter 30 is essentially provided in a rotationally symmetrical form. The connection between adapter 30 and glass pane 50 is provided, according to the present invention, along a curve which has an oval shape in particular. The connecting contact area between adapter 30 and glass pane 50 is indicated in FIG. 1 by reference number 40. Adapter 30 and glass pane 50 are to be sealingly connected in this area. There is also a connecting surface between adapter 30 and sensor means 10 which is indicated in FIG. 1 by reference number 20. This connecting surface is also provided in a sealed manner according to the present invention. Overall, the seals in areas 20 and 40 create a closed volume between sensor means 10 and glass pane 50 which is indicated in FIG. 1 by reference number 32. Closed volume 32 is also referred to below as contact space 32 between sensor means 10 and glass pane 50. The present invention provides a partial vacuum in contact space 32. This partial vacuum according to the present invention should be present under all permissible operating conditions, i.e., a pressure which is lower than the atmospheric pressure should develop in contact space 32 in all possible operating situations.

Figure 2:
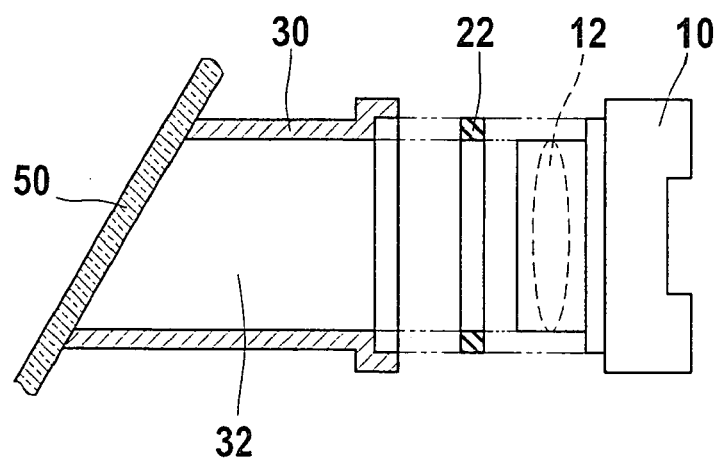
FIG. 2 shows an exploded view of the attachment of the measuring system to the glass pane according to the present invention.

FIG. 2 shows an exploded view of the attachment of sensor means 10 to glass pane 50 according to the present invention. This figure again shows glass pane 50, adapter 30, contact space 32, and measuring device 10 or sensor means 10 and its optical system 12. A sealing ring 22, sealing contact area 20 between adapter 30 and sensor means 10 illustrated in FIG. 1, is provided between adapter 30 and sensor means 10 in a particularly advantageous manner according to the present invention.

Figure 3:
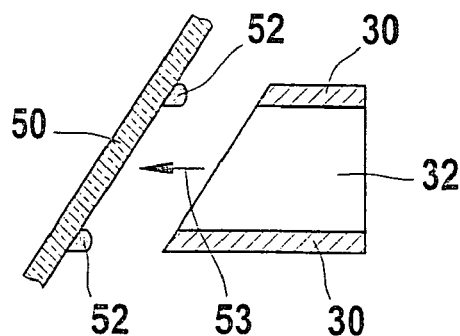
FIG. 3 shows the joining step between the adapter and the glass pane.

FIG. 3 shows a joining step of adapter 30 on glass pane 50 with regard to the method of attaching a sensor means 10 according to the present invention. Adapter 30 is attached on glass pane 50 in particular by gluing or bonding according to the present invention. An adhesive bead 52 is applied on glass pane 50, for example, and subsequently adapter 30 is fixed to adhesive bead 52; the actual setting into a position through the movement of adapter 30 is indicated by an arrow using reference number 53. The attachment of adapter 30 to glass pane 50 creates a positive and sealed engagement of adapter 30 on glass pane 50.

According to the present invention, contact space 32, still open at this stage, is cleaned in particular after attachment of adapter 30 which is also referred to below as mounting adapter 30. After cleaning, according to the present invention contact space 32 is sealed in particular by using a film, i.e., by applying a foil seal to adapter 30.

FIG. 4 shows additional method steps for attaching sensor means 10 on glass pane 50. According to the present invention, sensor means 10 is, in particular, initially pushed through the foil seal which is labeled with reference number 24 in FIG. 4. As a result foil seal 24 is at least partially destroyed. According to the present invention, it is alternatively also provided to remove and not to destroy foil seal 24, which was applied after cleaning of contact space 32, prior to inserting measuring device 10. In an additional method step according to the present invention, measuring device 10 is then pressed onto a sealing surface between adapter 30 and measuring device 10. According to the present invention, sealing ring 22, which is shown in FIG. 2, but not in FIG. 4, is used for this purpose or alternatively an adhesive bead (not shown in FIG. 4) or a positively engaged contact surface is provided. However, for all alternatives according to the present invention a basic tightness exists between adapter 30 and measuring device 10 and measuring device 10 is roughly positioned relative to adapter 30.

In a further method step for establishing the attachment according to the present invention contact space 32 is at least partially evacuated. This is achieved according to the present invention in particular by providing an orifice 34 in the adapter, shown in FIG. 4, through which a portion of the medium present in contact space 32 is removable from contact space 32. This is illustrated in FIG. 4 using an arrow labeled with reference number 33. By generating the partial vacuum in contact space 32, according to the present invention the joining process of measuring device 10 into adapter 30 is supported and, with the appropriate design of the contact point between adapter 30 and measuring device 10, fine positioning and/or self-adjustment of measuring device 10 to adapter 30 is also provided.

As the fastening method between adapter 30 and measuring device 10 according to the present invention, measuring device 10 is screwed in, molded in, snapped in, glued, clamped, fastened by using a bayonet catch or by shrinkage in particular. The sealing surface in contact area 20 illustrated in FIG. 1 between adapter 30 and measuring device 10 is provided according to the present invention as an alternative in particular as a metal seal, a ceramic seal, an O-ring, an adhesive compound, a putty compound, or as shrinkable hose. Depending on the fastening method selected or the design of the sealing surface selected between adapter 30 and measuring device 10, the sealing process must be either thermally supported, by curing of an adhesive, for example, or chemically supported, via a chemical reaction in a multi-component adhesive, a UV curing for example, or mechanically supported, for example via deformation, friction welding, or the like. According to the present invention, a fastening method or a sealing method which allows the components to be separated again is used in particular.

According to the present invention, a sealer or a sealed contact of measuring device 10 and glass pane 50 is established, the installation of measuring device 10 on glass pane 50, as well as the attachment of measuring device 10 on glass pane 50, being supported by the partial vacuum in contact space 32. The climatic conditions during the installation of measuring device 10 on glass pane 50 determine the measurement quality of measuring device 10 in operation. In particular trapped particles which may accumulate on optical surfaces, in the visual area or on lenses for example, interfere with the measuring operation of measuring device 10. Furthermore, air moisture is an interfering factor which, in the event of climate changes, may condense on optical surfaces or may result in icing.

The joining process or the installation process of optical measuring device 10, which must be performed in alignment, may be supported by a local partial vacuum in contact space 32, which in addition improves the durability of the contact between measuring device 10 and glass pane 50. The alignment of optical measuring device 10 is performed in particular by using the pre-installed adapter 30. According to the present invention, the partial vacuum in contact space 32 is maintained under all permissible manufacturing and operating conditions, in particular with regard to temperature variations and external pressure variations.

According to the present invention, the remaining gas volume in contact space 32 does not contain reactive gas components which result in interfering surface alterations on the optical surfaces. Furthermore, the remaining gas volume in contact space 32 contains only so much water vapor that it does not condense under the specified operating conditions, i.e., the relative air moisture remains at less than 100%, or it condenses on non-critical surfaces known as screen surfaces, for example. Such screen surfaces are provided according to the present invention by the design layout of adapter 30 for avoiding the condensation of optically active surfaces. The water vapor still present in contact space 32 may therefore be bound to the screen surfaces, for example. The specified operating conditions are defined according to the present invention in particular by the definition of a minimum and a maximum operating temperature and by the definition of a minimum and a maximum ambient operating pressure. A temperature of −40° C. may be provided in particular as the minimum operating temperature.

According to the present invention, the connection between adapter 30 and glass pane 50 or the connection between measuring device 10 and adapter 30 is separable, in particular, and the partial vacuum in contact space 32 provided according to the present invention may be removed for maintenance purposes, for example. According to the present invention, the partial vacuum in contact space 32 may be generated by heating the gas volume in contact space 32 to a temperature above the permissible operating temperature and subsequently cooling the gas volume. Contact space 32 must be sealed after heating and before cooling. A partial vacuum is thus created in the gas volume of contact space 32 during the cooling-down process, the partial vacuum being maintained as long as the temperature of the system does not exceed the permissible maximum temperature of the operating condition. As an alternative, the partial vacuum in contact space 32 may also be generated by the evacuation of contact space 32 using a valve or an orifice 34 illustrated in FIG. 4.) Here, according to the present invention, the active evacuation of contact space 32 contributes to the support of the alignment and joining process between adapter 30 and measuring device 10 in particular. According to the present invention, the contamination in particular of contact space 32 is avoided, in particular the contamination by dust, moisture, and the like.

Furthermore, according to the present invention, the amount of enclosed water vapor is minimized by supplying "dry" inert purge gases during installation which are also referred to below as purge gases such as $N_2$ gas. Alternatively, according to the present invention, a slight excess pressure may be provided particularly advantageously to the purge gas during the joining process so that adapter 30 and contact space 32 are blown free. Contact space 32 is subsequently evacuated again. According to the present invention, it should be ensured that materials that do not release gases are used for contact space 32 or for components adjoining contact space 32. Alternatively to the evacuation of the contact space, according to the present invention, contact space 32 may also be filled bubble-free with an optically and, depending on the application, also NIR-transparent, inert, liquid medium. When a liquid medium is used, according to the present invention, a partial vacuum may additionally be generated. This, however, poses the risk of bubble formation by output gases. If adapter 30 is not rigid, the partial vacuum becomes manifest in a deflection of its walls. According to the present invention, it is advantageously possible to implement a strengthening force on the connections, in particular adhesive connections, to glass pane 50.

FIG. 5 shows an illustration of three sides of receiving adapter 30 according to the present invention. Receiving adapter 30 includes contact space 32, orifice 34 for evacuation, and a number of attachment nubs which are all labeled with reference number 35 in FIG. 5. A view of receiving adapter 30 is illustrated in the upper right part of FIG. 5, the direction of projection for the illustration coinciding with optical axis 11 and a section line A—A being shown. A sectional view of receiving adapter 30 along intersection line A—A is illustrated in the upper left part of FIG. 5. Optical axis 11 is again shown. A top view of receiving adapter 30 is illustrated in the lower part of FIG. 5.

Attachment nubs 35 are provided at different points of the contact surface of receiving adapter 30 on the windshield which is not shown in FIG. 5. According to the present invention, attachment nubs 35 are provided for the purpose of accurately defining the position of the receiving adapter relative to the windshield. Adhesive bead 52, illustrated in FIG. 3 but not in FIG. 5, is provided according to the present invention in such a way that it fills in the void between receiving adapter 30 and the windshield at the points of receiving adapter 30 where there are no attachment nubs 35. According to the present invention, attachment nubs 35 are provided in such a way that they have an adaptable design for fitting windshields of different shapes. Their height and their convexity in particular may be varied. This makes it possible, even when used on windshields of different shapes, to retain the basic shape of receiving adapter 30 unchanged and to nonetheless achieve an accurate alignment and an accurate positioning of the receiving adapter. This has the advantage in particular that tools, for injection molding, for example, may be used unchanged with regard to the receiving adapter or at least with regard to the largest part of receiving adapter 30, resulting in lower manufacturing costs. The adaptation to different shapes of windshields takes place by adapting the height and convexity or the height and shape of attachment nubs 35, resulting either in an unchanged manufacturing tool of receiving adapter 30 or at least only in a marginal change of the manufacturing tool of the receiving adapter.

What is claimed is:

1. A connecting device for attaching a sensor device relative to a glass pane of motor vehicle, comprising:
    a structure including a contact space to be located between the sensor device and the glass pane, wherein the contact space is sealed, and a partial vacuum is provided in the contact space; and
    an arrangement for performing: a) heating an inside of the contact space; b) following the heating, sealing the contact space; and c) subsequent to the sealing, cooling the inside of the contact space.

2. The connecting device as recited in claim 1, wherein:
    a maximum amount of water vapor is provided in the contact space in such a way that a relative air moisture is less than 100% under a provided operating condition.

3. The connecting device as recited in claim 1, wherein:
    a dry gas is provided in the contact space.

4. The connecting device as recited in claim 1, further comprising:
    at least one of an optically-transparent liquid medium and an NTR-transparent liquid medium provided in the contact space.

5. The connecting device as recited in claim 1, further comprising:
    attachment nubs provided on a surface of the structure facing the glass pane.

6. A method of attaching a sensor device relative to a glass pane of a motor vehicle, comprising:
    situating a connecting device between the sensor device and the glass pane in an area defining a contact space; and
    generating a partial vacuum in the contact space, wherein the generating the partial vacuum includes:
        heating an inside of the contact space,
        following the heating, sealing the contact space, and
        subsequent to the sealing, cooling the inside of the contact spaces.

7. The method as recited in claim 6, wherein the generating the partial vacuum includes:
    performing an evacuating using an orifice in the contact space, and
    subsequent to the evacuating, sealing the contact space.

8. The method as recited in claim 6, further comprising:
    providing at least one of optically-transparent liquid medium and an NIR-transparent liquid medium in the contact space.

9. A sensor system of a motor vehicle, comprising:
    a glass pane of a motor vehicle;
    a sensor device;
    a connecting device for attaching the sensor device to the glass pane, wherein the sensor device includes: a structure having a contact space located between the sensor device and the glass pane, wherein the contact space is sealed and a partial vacuum is provided in the contact space; and attachment nubs provided on a surface of the structure facing the glass pane.

* * * * *